United States Patent [19]

Seybold

[11] Patent Number: 4,687,427
[45] Date of Patent: Aug. 18, 1987

[54] ROTARY INTERNAL COMBUSTION ENGINE WITH UNIFORMLY ROTATING PISTONS COOPERATING WITH REACTION ELEMENTS HAVIG A VARYING SPEED OF ROTATION AND OSCILLATING MOTION

[76] Inventor: Frederick W. Seybold, 1979 Dogwood Dr., Westfield, N.J. 07090

[21] Appl. No.: 855,315

[22] Filed: Apr. 24, 1986

[51] Int. Cl.⁴ .............................................. F02B 53/00
[52] U.S. Cl. ........................................ 418/34; 418/36
[58] Field of Search .................... 123/245; 418/35, 36, 418/37

[56] References Cited

U.S. PATENT DOCUMENTS

| | | | |
|---|---|---|---|
| 1,353,205 | 9/1920 | Woodward | 418/34 |
| 1,839,275 | 1/1932 | Sweningson | 418/34 X |
| 3,061,180 | 10/1962 | Durgin | 418/36 |
| 3,858,560 | 1/1975 | Harrington | 418/36 |
| 3,955,541 | 5/1976 | Seybold | 123/245 |
| 3,981,638 | 9/1976 | Hutterer | 418/34 |
| 4,057,374 | 11/1977 | Seybold | 418/36 |
| 4,136,661 | 1/1979 | Posson | 418/36 X |
| 4,174,930 | 11/1979 | Posson | 418/36 |
| 4,455,228 | 6/1984 | Seybold | 418/34 |

FOREIGN PATENT DOCUMENTS

| | | | |
|---|---|---|---|
| 1098520 | 2/1961 | Fed. Rep. of Germany | 418/36 |
| 1122549 | 1/1962 | Fed. Rep. of Germany | 418/36 |
| 2435823 | 2/1976 | Fed. Rep. of Germany | 418/34 |
| 160125 | 3/1921 | United Kingdom | 418/36 |

Primary Examiner—Michael Koczo
Attorney, Agent, or Firm—Martha G. Pugh

[57] ABSTRACT

A rotary internal combustion engine comprising a stationary, water-cooled housing having a large cylindrical bore in which a hollow cylinder with end walls rotates at a uniform speed. On said cylinder a pair of wedge-shaped pistons is mounted diametrically-opposed to a similar pair of reactor elements carried by a multiple-splined shaft, said reactor elements and said pistons forming a combustion chamber whereby a gas and air mixture is compressed prior to ignition; and while expansion is taking place said reactor moves many degrees oppositely to the uniformly rotating piston and thereby increasing the power of the engine. This reverse rotation of the reactor elements is produced by a gear mechanism which provides a substantial period of reverse rotation and a longer period of rotation in the same direction as the piston, but at a higher speed, whereby the burned gases will be exhausted as the reactor element approaches its mating piston and/or compresses the intake mixture of gas and air between the other of pistons and reactor elements before a second ignition takes place during one revolution of the cylinder.

7 Claims, 13 Drawing Figures

FIG. 11

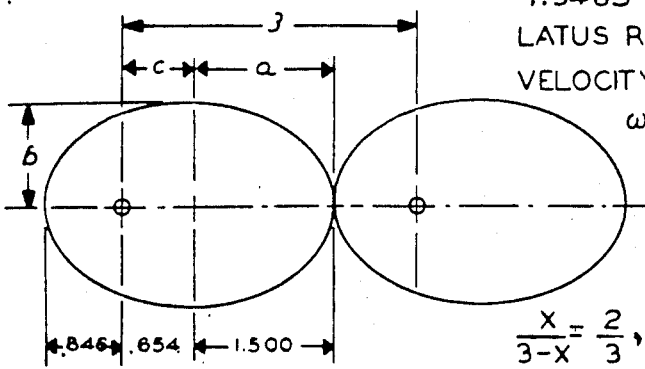

$e = \dfrac{c}{a} = \dfrac{.654}{1.500} = .4363 \quad c = \text{ECCENTRICITY}$ $b = a\sqrt{1-e^2} = 1.5 \times \sqrt{.809904} = 1.5 \times .899 = 1.3485$ $\text{LATUS RECTUM} = \dfrac{2b^2}{a} = 2a(1-e^2) = 2.4297$

VELOCITY OF PINION D (55) = 0, WHEN $\omega\phi = \dfrac{2}{3}$ $\dfrac{X}{3-X} = \dfrac{2}{3}, \quad 3X = 6-2X, \quad 5X = 6, \quad X = 1.2$ $\dfrac{\text{½ LATUS RECTUM}}{1 - e\cos\theta} = \dfrac{1.2148}{1 - .4363\cos\theta} = 1.2$ $1.2148 = 1.2 - 1.2(.4363\cos\theta)$ $.0148 = -.5232\cos\theta$ $\cos\theta = \dfrac{.0148}{.5232} = -.02828 \quad \theta = 91°\,37'$

FIG. 12

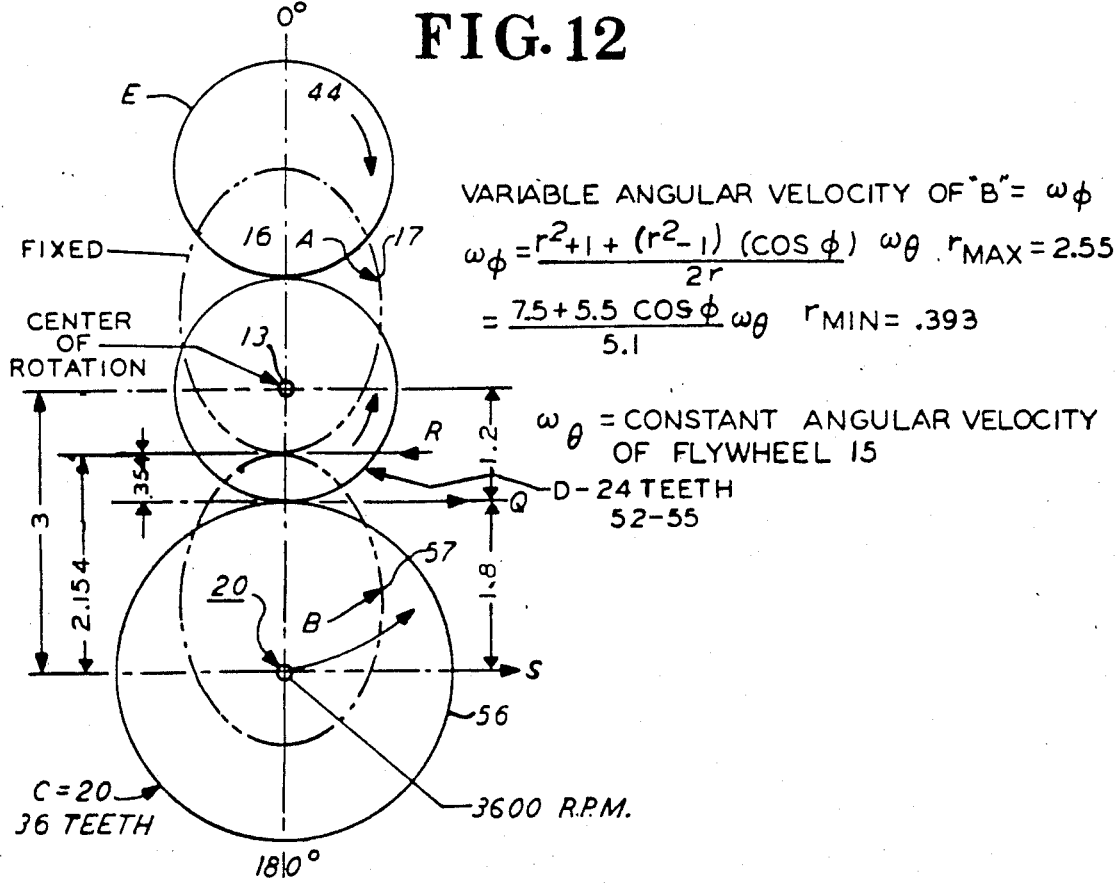

VARIABLE ANGULAR VELOCITY OF "B" = $\omega\phi$ $\omega\phi = \dfrac{r^2 + 1 + (r^2 - 1)(\cos\phi)}{2r}\omega\theta \quad r_{MAX} = 2.55$ $= \dfrac{7.5 + 5.5\cos\phi}{5.1}\omega\theta \quad r_{MIN} = .393$ $\omega\theta$ = CONSTANT ANGULAR VELOCITY OF FLYWHEEL 15

D - 24 TEETH  
52-55

C = 20  
36 TEETH

3600 R.P.M.

ROTARY INTERNAL COMBUSTION ENGINE WITH UNIFORMLY ROTATING PISTONS COOPERATING WITH REACTION ELEMENTS HAVING A VARYING SPEED OF ROTATION AND OSCILLATING MOTION

SHORT DESCRIPTION OF THE INVENTION

The rotary engine disclosed is a modification and simplification of the rotary engines disclosed in my U.S. Pat. No. 4,054,378, issued Nov. 8, 1977 and U.S. Pat. No. 4,455,128, issued June 19, 1984.

AS disclosed in my prior patents, the structural elements comprising the rotary engine consist of a water-cooled housing having a large cylindrical bore in which a hollow rotor with axially spaced side walls is free to turn and on which two wedge-shaped diametrically-opposed pistons are mounted.

In the present embodiment, these side walls have long hubs carrying ball bearings. The pistons cooperate with similarly shaped reaction members enclosed in this cylindrical rotor; and they are mounted on a multiple-splined primary shaft, which shaft has both ends journaled in the long hubs of the rotor. One of the primary shaft ends has serrations on which a spur gear is mounted, while the other end of the primary shaft rotates in one of said long hubs.

The water-cooled housing in this embodiment is confined between spaced vertical walls which support said ball bearings on the long hubs. On each of the vertical walls, a roller bearing provides support for a drive shaft to which a flywheel is secured; and this drive shaft is also supported on a ball bearing carried in a housing encasing said flywheel.

An elliptic gear is fastened to the flywheel housing; and it mates with another elliptic gear which is compounded with a spur gear. This pair is mounted on ball bearings carried by the flywheel. The latter spur gear mates with a compound pinion which turns freely on the drive shaft; and the spur gear carried by the multiple-splined primary shaft mates with said compound pinion.

In accordance with a specific feature of the embodiment disclosed, one of the previously mentioned hubs on these vertical walls is threaded to receive a sprocket suitable for a silent chain drive. A smaller sprocket is secured to the long drive shaft. The two sprockets are coupled by a chain which completes the drive. This may be of a type called "Silent Chain Drive", which is manufactured by the Ramsey Products Corporation of Charlotte, N.C.

Suitable exhaust and intake ports are provided in the water-cooled housing in the proper location. Longitudinal slots in the rotor serve as in and out passages to and from the rotor to the porting.

Two spark plugs projecting through the water-cooled housing will ignite the gas and air mixture when these slots become aligned with the spark plugs.

A particular feature of the present invention is the gearing mechanism for producing reverse rotation of the reactor elements, wherein the primary shaft and drive shaft are mechanically coupled by a chain and sprocket system, making the gear drive simpler and more efficient than in the prior systems.

SHORT DESCRIPTION OF THE DRAWINGS

FIG. 1 is a transverse section of the two piston rotary engine;

FIG. 1A is a front-elevational showing of the sprockets 39 and 47, with the chain drive 45 in place.

FIG. 6 shows the angular velocity constant of the planet elliptical gear corresponding to a position of the flywheel.

Figure 9:
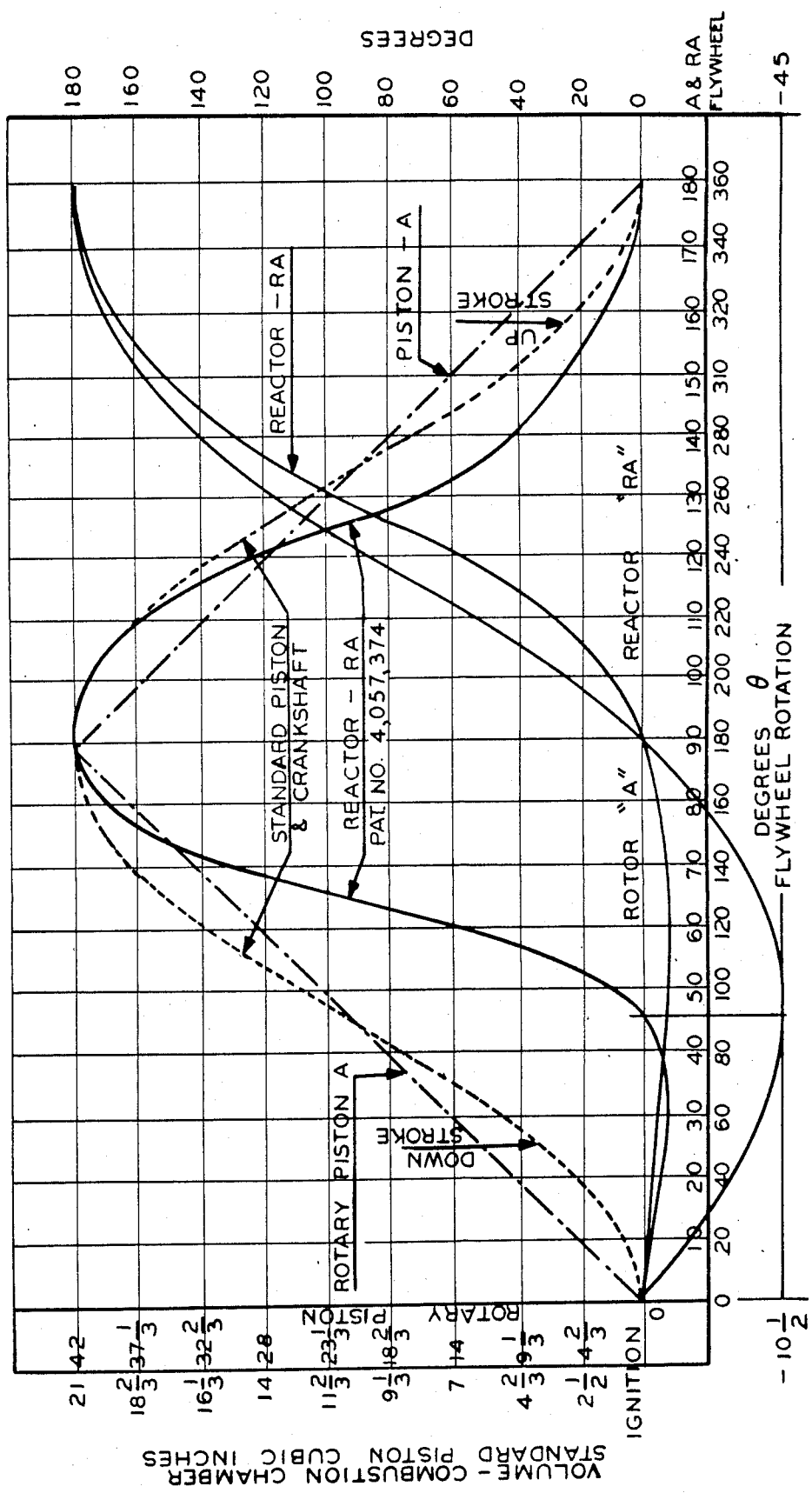

FIG. 9 compares the combustion chamber volume of a standard piston crankshaft engine to that of rotary engine disclosed in U.S. Pat. No. 4,057,374 and to the new improved rotary engine; it also shows the reactor position corresponding to different angles of flywheel rotation.

Figure 10:
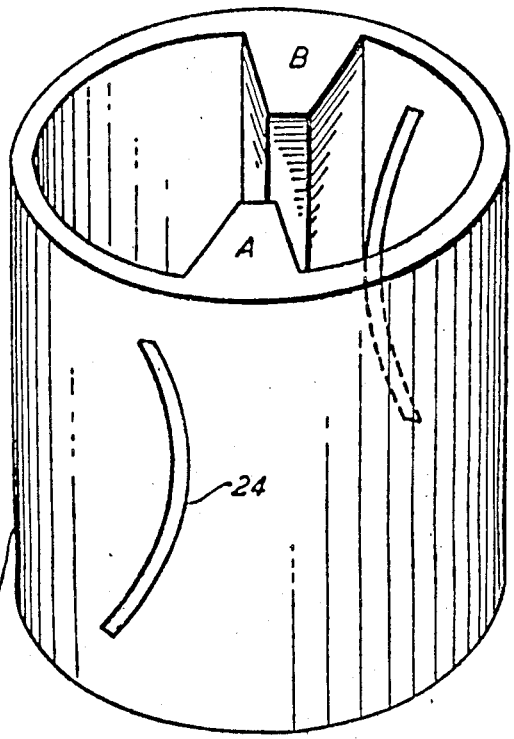
Figure 5:
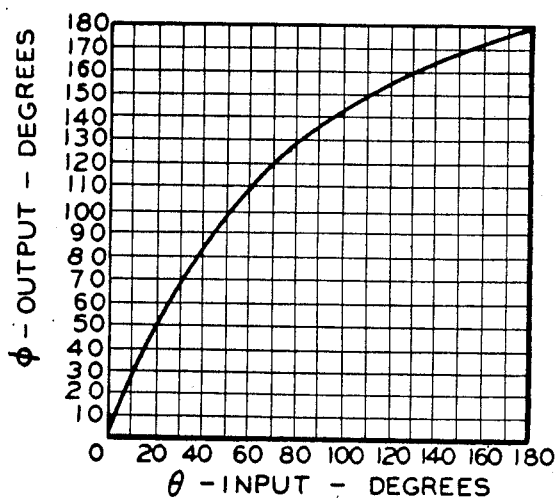

FIG. 10 is a view of the engine rotor showing axial, helical slots adjacent to each piston face.

FIG. 11 shows the method used in computing the flywheel position when the angular velocity of the planet elliptic gear is $\frac{2}{3}$.

FIG. 12 shows the formula used in computing the angular velocity of the planet elliptical gear and the torques imposed on the gears and the flywheel.

DETAILED DESCRIPTION OF THE INVENTION

As disclosed in my prior U.S. Pat. No. 4,057,374 and U.S. Pat. No. 4,455,128, the components of the engine may be divided into five assemblies:

I. The water-cooled housing assembly;
II. The flywheel housing assembly;
III. The flywheel and its associated gearing;
IV. The rotor assembly and its associated gearing;
V. The reactor assembly and its associated gearing.

I. The water-cooled housing assembly comprises the central portion 12 and the side portions 16 and 16a. An end cover 19 fastened to side portion 16 will form a reservoir for lubricating oil. All three portions are provided with cavities 28 for the reception of cooling water. A large cylindrical bore 26 is provided into which a rotor 27 is closely fitted for rotation therein. This central portion is also provided with an intake port 37 and an exhaust port 36. Two spark plugs 38 are spaced on top of this central portion 12.

II. The flywheel housing 10 is provided with a ball bearing 11 to support one end of a drive shaft 13. An elliptic reaction gear 17 is fastened to the housing 10 by means of the screws 18.

III. The flywheel assembly with its associated gearing comprises flywheel 15 secured to a shaft 13 by means of a key 41. A compound gear is mounted eccentrically to said shaft, said compound gear comprising an elliptic gear 57 meshing with the stationary elliptic gear 17, and a spur gear 56 meshing with pinion 55. This compound gear is journaled on ball bearings 58 held in the flywheel 15.

Figure 1:
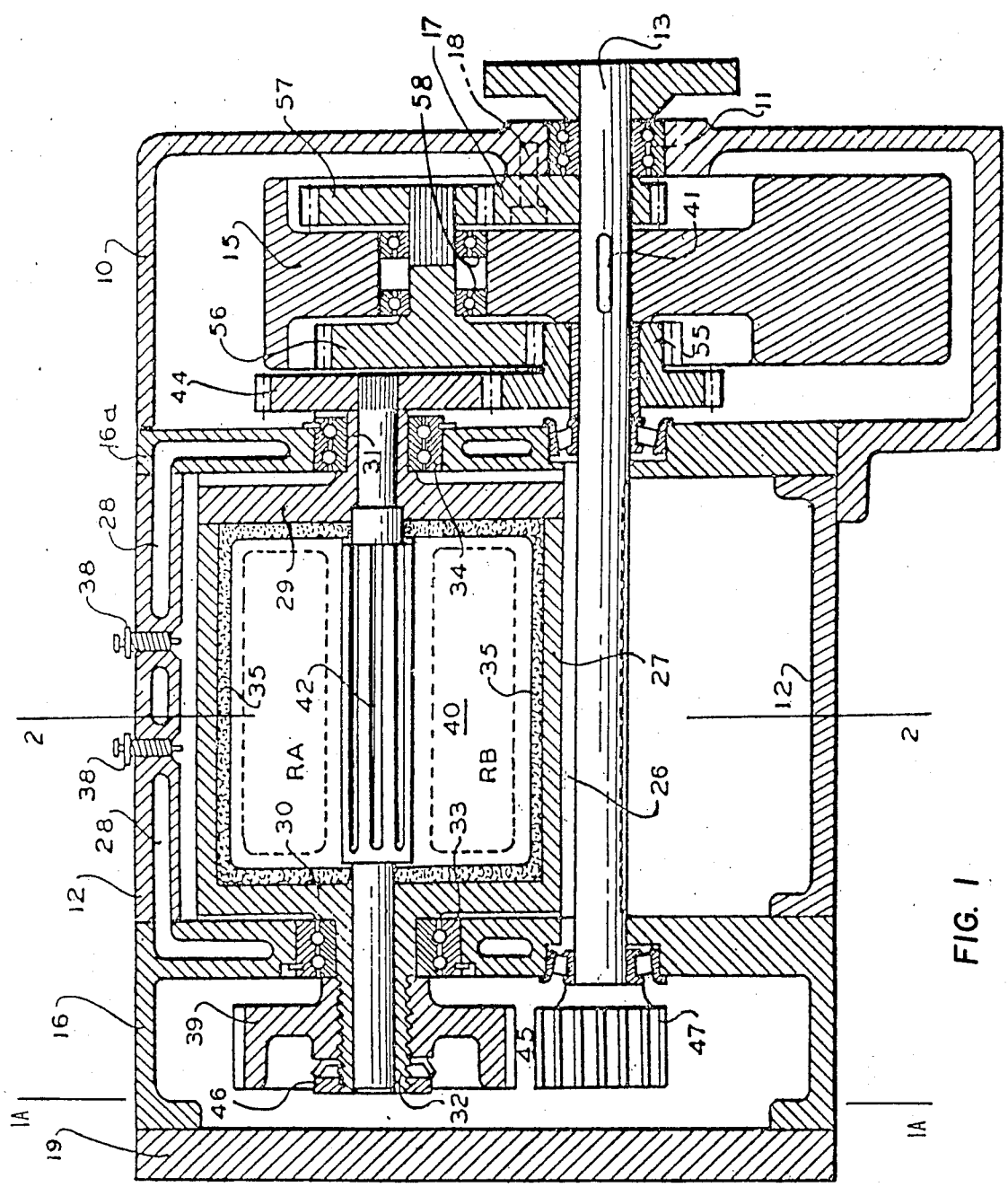
Figure 1A:
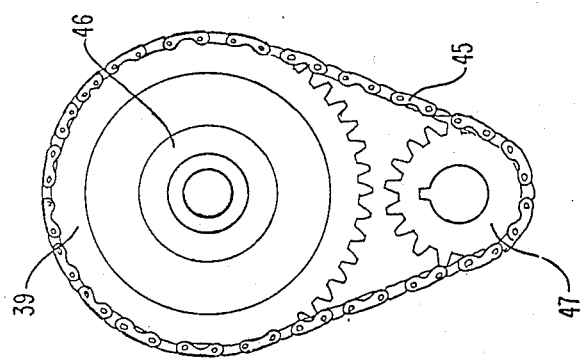

IV. The rotor 27 is closely fitted in the bore 26 for rotation therein. This rotor has side walls 29 and 30 from which project hubs 31 and 32, respectively. Between the walls 29 and 30 two diametrically-opposed wedge-shaped pistons A and B are secured to the rotor 27, and adjacent thereto are axial, longitudinal slots 24 and they serve as intake end exhaust passages for the air and gas mixture. On hub 31 a ball bearing 34 is mounted and supported in the side portion 16a of the water-cooled housing assembly. As a special feature of this embodiment, a similar ball bearing 33 is mounted on hub 32 which is elongated and threaded to receive a sprocket 39 and lock nut and washer 46. A smaller sprocket 47 is secured to the drive shaft 13; and a so-called "Silent Chain" removed to show the sprockets serves as the connecting means between these sprockets. FIG. 1A shows the chain 45 in place in driving relation on the sprockets 47 and 39. The chain 45, and the associated sprockets, are preferably of a type manufactured by the Ramsey Products Corporation of Charlotte, N.C., which are known as 'Silent Chain Drives'.

V. The reactor assembly comprises two wedge-shaped reaction elements RA and RB spaced between the side walls 29 and 30 of the rotor 27 and seals 35 are provided on the top and sides of the wedge-shaped reaction elements. The latter are held in grooves of a sleeve fitted over the long multiple-splined shaft 42. The latter is journaled in the long hubs 31 and 32 of the rotor assembly. A spur gear 44 is secured to shaft 42 and it engages pinion 43, the latter being integral with pinion 55 and sleeve 36 and free to rotate on shaft 13.

OPERATION OF THE ENGINE

An elliptic gear pair produces a varying angular rotation of the driven gear when the driving gear has a uniform angular rotation. The maximum angular speed of the driven gear is greater than the uniform driving gear speed; it must be no less than $2\frac{1}{2}$ times the angular velocity of the driving gear, and the minimum angular velocity, which is the reciprocal of its maximum angular velocity, will cause a reversal of rotation of compound spur gear 55; and since said gear 55 must make one net revolution of 360 degrees per cycle it will have rotated more than 360 degrees during one cycle.

The variable speed ratios of spur gear 55 corresponding to one revolution of the uniformly rotating flywheel 15 are determined by the well-known step method for planetary gearing, wherein one member remains stationary.

Assume that the flywheel 15, the elliptic gears 17 and 57 are locked together and in this condition they are made to turn (+1) revolution, as shown in the first line below.

Next on the second line the gearing is now assumed to be in its normal unlocked condition, the flywheel 15 is held stationary (0), and the elliptic gear 17 is turned in the opposite (−1) direction, thereby returning gear 17 to its normal stationary condition. One then observes the amount and direction of rotation of the compound gearing comprising the elliptic gears 17 and 57 and the compound spur gears 57 and 56.

Then on the third line are recorded the sum of lines 1 and 2; and it also shows the variable angular velocity in amount and direction of the spur gear 55 for (+1) revolution of the flywheel 15, the ratio of gear 56/gear 55 being equal to 3/2.

| Flywheel 15 | Elliptic Gear 17 | Spur Gear 55 |
|---|---|---|
| 1 | 1 | $1 - \frac{\text{Gear 17} \times \text{Gear 56}}{\text{Gear 57} \times \text{Gear 55}}$ |
| Hold 0 | −1 | |
| 1 | 0 | $1 - \frac{\text{Gear 17}}{\text{Gear 57}} \times \frac{3}{2}$ |
| Maximum angular velocity of spur gear 55 | | $1 - (2.55 \times 1.5) = -2.825$ |
| Mean angular velocity of spur gear 55 | | $1 - (1 \times 1.5) = -.500$ |
| Minimum angular velocity of spur gear 55 | | $1 - (.393 \times 1.5) = +.411$ |

Figure 6:
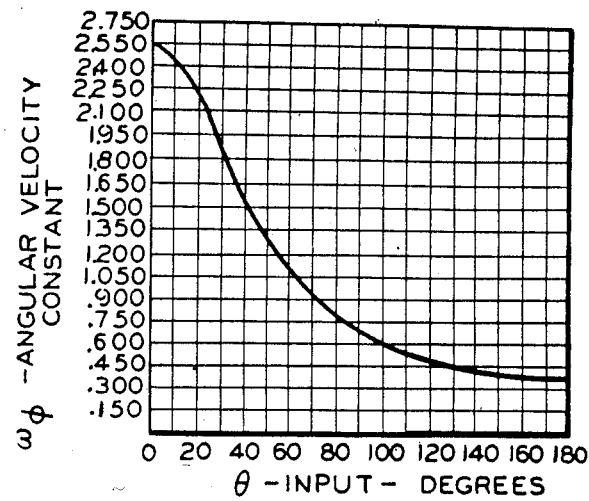
FIG. 6 shows the relation between the angle of flywheel rotation and the corresponding motion of the planet elliptical gear.
Figure 7:
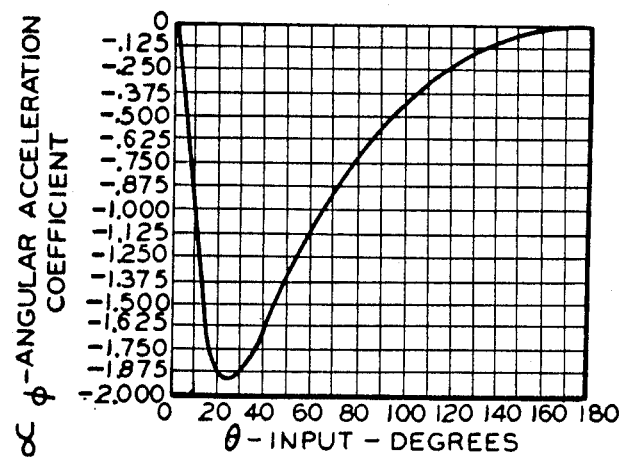
FIG. 7 shows the angular acceleration co-efficient of the planet elliptical gear corresponding to a position of the flywheel.

FIG. 6 shows the velocity ratio of the elliptic gears, their maximum ratio being 2.55:1, their mean ratio being unity, and their minimum ratio being 0.393.

Figure 8:
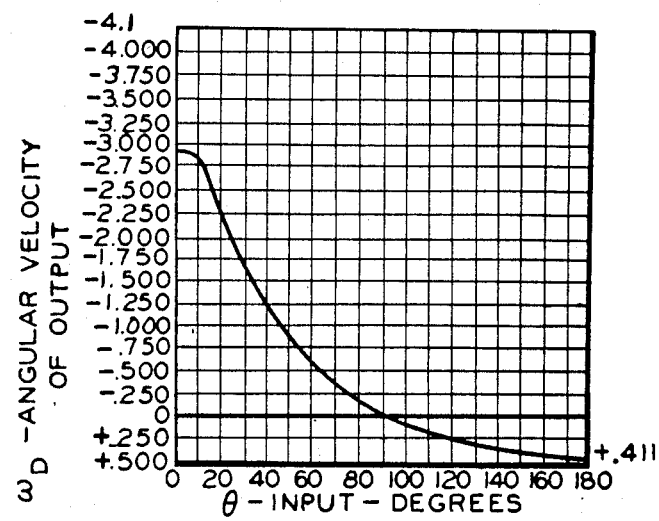
FIG. 8 shows the angular velocity of the output member of the reverted gear train receiving power from the reactor of the rotary engine.

FIG. 8 shows the angular velocity of the spur gear 55, its maximum angular velocity is 2.825 times that of the flywheel, and it turns oppositely. The spur gear 55 will reverse when the angular velocity ratio between the elliptic gears is $\frac{2}{3}$ and it occurs when the flywheel has turned 91 degrees 37'.

FIG. 11 shows the analytic geometry relations of the ellipse having foci of 3 inches and an eccentricity of 0.4363 inches.

As the angular velocity of the rotor is $\frac{1}{2}$ that of the flywheel, the rotor with pistons will have turned approximately 90 degrees before the reactor elements begin to turn slowly in the same direction. Expansion is still proceeding until the piston uncovers the exhaust port and the expulsion of the burned gas will take place at a rapid rate.

Since there are two sector-shaped combustion chambers in the rotor there will occur two power pulses during one revolution of the rotor and two revolutions of the flywheel. It follows, therefore, that an engine constructed according to the above description is equivalent to a four-cylinder piston engine, or a "Wankel" engine having two rotors.

Figure 3:
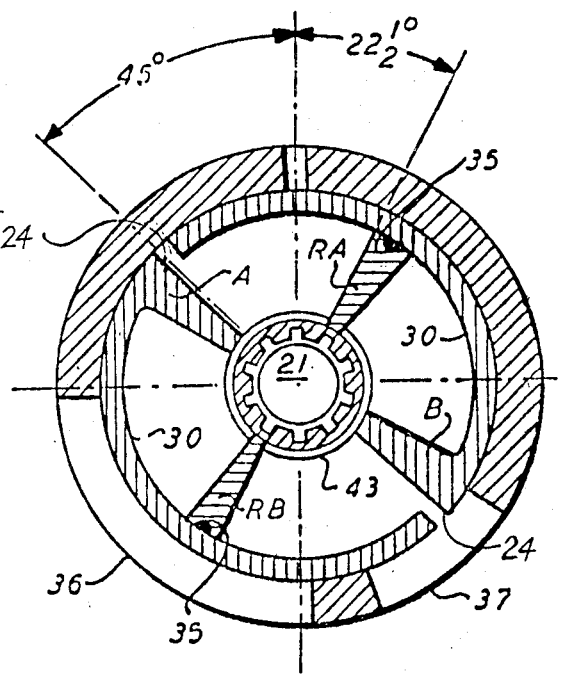
FIG. 3 is a similar section taken along line 2—2 of FIG. 1, showing the position of the piston and the reactor midway during the expansion of the air and gas combustion.
Figure 4:
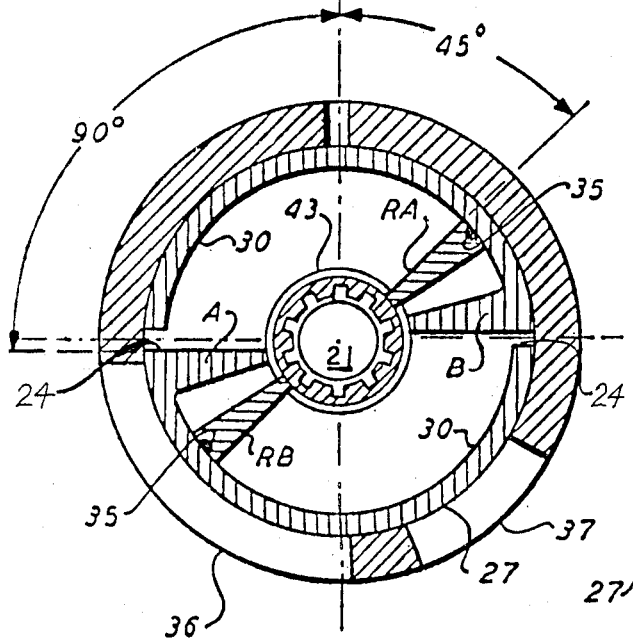
FIG. 4 is also a section taken along line 2—2 of FIG. 1, showing the position of the pistons and reactors at the completion of the expansion.

The expansion pressure on the piston and the reaction elements is at all times the same. The amount of power delivered by each varies directly with its speed of rotation. Therefore, at the flywheel position 0 equal to 90 degrees, (See FIG. 9); rotor position A at 45 degrees, and the reaction element RA position at $22\frac{1}{2}$ degrees, (See FIG. 3); the reaction element delivers 0.411 or 41% of the amount of power delivered by the piston A. (See FIG. 8).

Assume the following dimensions for the improved rotary engine:

Rotor bore 26 = 7 inch in diameter. Multiple-splined shaft 47 = 1 inch diameter;

Chamber area = $\frac{1}{4}$ of $0.7854 \; (7^2 - 1^2) = 37.7/4 = 9.35$ in.$^2$

Rotor length 4.5 in. Volume of one chamber = $9.35 \times 4.5 = 42$ in.$^3$

Piston area A = $3 \times 4.5 = 13.5$ in.$^2$

Mean effective pressure = P = 100 lb. per sq. in. acting on the above area at 2.1 in. radius or 0.175 ft. on a 90 degree arc or $\pi/2$ radians L = 0.276 ft.

Revolutions per min. $N = 1800$

Intakes per revolution 2

$$HP = \frac{2PLAN}{33000} = \frac{2 \times 100 \times .276 \times 13.5 \times 1800}{33000} = 40.5$$

In the above computation no account was taken of the power which would have been delivered by the reaction element through gearing to the flywheel.

Volume of gas per min. $= 2 \times 42 \times 1800 = 151{,}200$ in.$^3$ per min.

A standard 4-cylinder crankshaft engine having a 3 inch bore and a 3 inch stroke at a speed of 3600 R.P.M. would have:

Volume of gas $= 3 \times 7 = 21$ in.$^3$

Volume of gas per min. $2 \times 21 \times 3600 = 151{,}200$ in.$^3$ per min.

$$HP = \frac{2PLAN}{33000} = \frac{2 \times 100 \times .25 \times 7 \times 3600}{33000} = 38.2$$

Figure 2:
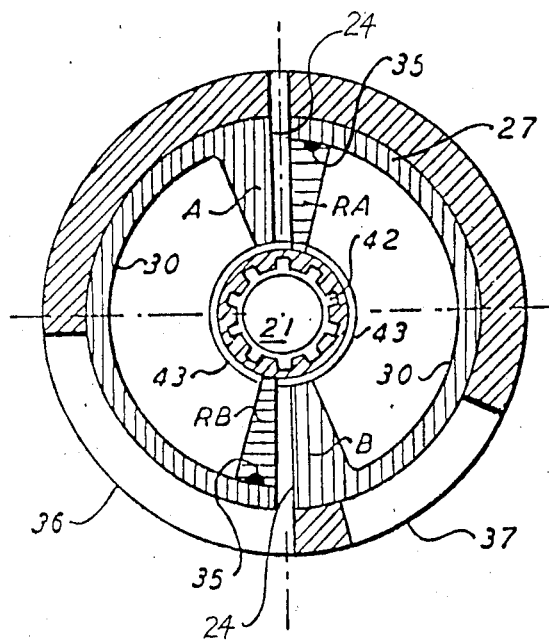
FIG. 2 is a section taken along line 2—2 of FIG. 1 showing the position of the pistons and reactors in rest position.

On FIG. 12, is shown the configuration of the gearing when the reactor element RA has moved to the position as shown in FIG. 2 and it has attained its maximum angular velocity of 0.411 of flywheel speed.

Since the flywheel usually rotates counterclockwise (−) when viewed from the driver's seat, its rotation is indicated by "S". The rotor piston A will also rotate in a counterclockwise direction, but at ½ the flywheel speed. Therefore, the reactor RA will rotate clockwise (+) with the pinion 44 thereon and making compound gear 55 turn counterclockwise (−).

As stated before, the torque "T" caused by the expanding gas is the same for piston A and the reactor element RA. Therefore, the tooth pressure "Q" on spur gears 55 and 56 is T/1.2, "T" being in inch-pounds. From this it is possible to determine the load "S" at point "B" of the flywheel 15, the tooth on elliptic gear 17 serving as the reaction fulcrum "R".

Then taking moments around "R", we have $0.354 \times Q = 2.154$ S;

$$\text{then load "S"} = \frac{.354 \times T}{2.154 \times 1.2} = 0.1369 \, T.$$

Torque at "B" $= 3 \times$ load "S" $= 3 \times 0.1369$ T $= 0.4108$ T

Speed of Flywheel $15 = 3600$ R.P.M.

Reaction element power $= 0.4108$ T $\times 3600 = 1480$ T

The power transmitted by the piston "A" $= 1800$ T.

$$\text{Ratio} = \frac{\text{Reaction element power RA}}{\text{Piston Power A}} = \frac{1480 \, T}{1800 \, T} = .82$$

In other words, the reaction element RA transmits 82% as much power as is delivered by piston A at the 180 degrees position of the flywheel 15. In a complete calculation by computer using the Fortran method, the ratio Q/S of the moment arms was 0.354/2.154, designated by symbol "M" on the computer read-out, at the 90 and 270 degree positions of the flywheel would be zero. Therefore, the average ratio between 90 and 270 degrees positions by computer was 0.100. Then the average power transmitted by the reaction element $$\text{RA is} = \frac{3 \times .100 \times 3600 \times T}{1.2} = 900 \, T$$

-continued $$\text{Ratio} = \frac{\text{Reaction element power RA}}{\text{Piston Power A}} = \frac{900 \, T}{1800 \, T} = .500$$

The computer also traced the curves shown in FIGS. 5, 6, 7 and 8 from the read-out data.

It is important, when making a comparison between a standard crankshaft piston engine (the Wankel Engine has eccentrics) and the described rotary engine, to call attention to their inherent kinematic deficiency.

At ignition, the gas pressure induced torque on the crankshaft is zero, while the rotary engine has a constant torque arm throughout the combustion cycle. The average value of the torque arm of a piston engine is 0.636 times the crank throw.

It will be understood that the invention is not limited to the specific forms or components described herein by way of illustration, but only by the scope of the appended claims.

What is claimed is:

1. An improved rotary internal combustion engine comprising in combination:

a water-cooled housing having a cylindrical bore, exhaust and intake ports, water-cooling cavities and ignition means;

a hollow cylindrical rotor rotatably disposed in said cylindrical bore, said rotor having two diametrically-opposed wedge-shaped pistons integral with said rotor, and axial, helical slots adjacent to said pistons, said rotor having axially spaced side walls with first and second hubs thereon for mounting snap-ring bearings, one of said hubs being constructed to receive adjustable locking means;

a first side housing having water-cooling cavities and bolted to said water-cooled housing and supporting one of said snap-ring bearings;

a second side housing having water-cooling cavities and bolted to said water-cooled housing and supporting another of said snap-ring bearings;

a primary shaft journaled in said first and second hubs, said shaft constructed to receive a spur gear fastened to one end;

a reaction element comprising two radially-directed diametrically-opposed wedge-shaped members mounted on said primary shaft, constructed for movement in periodical coalescing relation to said pistons;

a flywheel housing bolted to said second side housing;

a flywheel disposed in said flywheel housing and journaled on one end of a drive shaft supported on roller bearings in said flywheel housing;

a first compound gear supported on bearings mounted on said flywheel, said compound gear comprising a first spur gear and a first elliptic gear;

a second elliptic gear secured to said flywheel housing in mating relation with said first elliptic gear;

a compound pinion free to rotate on said drive shaft in mating relation with said first spur gear of said compound gear and said pur gear fastened on said primary shaft;

a first sprocket secured to the other end of said drive shaft in said first side housing;

a second sprocket larger than said first sprocket fixed on one of the hubs of said rotor at the opposite end of said drive shaft from said flywheel housing; and means comprising a chain drive connecting said first sprocket and said second larger sprocket for delivering power from said rotor to said drive shaft.

2. An improved rotary internal combustion engine comprising in combination the elements set forth in claim 1, wherein the spur gear on said primary shaft comprises means constructed and arranged for receiving, after ignition, a varying motion comprising a substantial reverse motion followed by a greater forward motion in excess of 180 degrees, and an angular reverse motion which is equal to said excess motion.

3. An improved rotary internal combustion engine comprising in combination the elements set forth in claim 1, wherein the velocity ratio between said first and second elliptic gear is greater than 2½ times the angular velocity of said flywheel.

4. An improved rotary internal combustion engine comprising in diameter of the compound pinion mating with the spur gear of said compound gear is ⅔ the diameter of said spur gear. combination the elements set forth in claim 1, wherein the 5. An improved rotary internal combustion engine comprising in combination the elements set forth in claim 1, wherein said flywheel comprises means constructed and arranged to make two revolutions per cycle to one revolution of said rotor.

6. An improved rotary internal combustion engine comprising in combination the elements set forth in claim 1, in which said spur gear on said end of said primary shaft is constructed to mate with said compound pinion freely rotating on said drive shaft, said mating spur gear and said compound pinion being of equal size.

7. An improved rotary internal combustion engine comprising in combination:
- a composite water-cooled housing having exhaust and intake ports, water-cooling cavities and ignition means, said housing comprising a central portion, a chain drive housing on one end and a flywheel housing on the other end, enclosing in the central portion thereof a cylindrical bore having a pair of axially-disposed bearings at opposite ends;
- a hollow rotor rotatably disposed in said cylindrical bore and having a pair of first and second diametrically-opposite hubs disposed in said bearings, said second hub being elongated and extending into said chain drive housing;
- means comprising a primary shaft interposed axially through said first and second rotor hubs;
- a first spur gear fixedly fastened to one end of said primary shaft adjacent said flywheel housing;
- a first sprocket fastened to the second elongated hub in which the other end of said primary shaft rotates freely;
- a drive shaft interposed in substantially parallel relation to said primary shaft and extending from the outer end of said flywheel housing through said central portion and terminating in said chain drive housing;
- a flywheel journaled on one end of said drive shaft and disposed in said flywheel housing;
- a second sprocket, substantially smaller than said first sprocket, disposed in fixed relation to the other end of said drive shaft, said first and second sprockets disposed in substantially co-planar relation in said chain drive housing;
- means comprising a chain drive surrounding said first and second sprockets, and constructed to drive said rotor and said flywheel in the same direction of rotation;
- said hollow rotor comprising internally a pair of pistons which project radially inward from opposite internal walls thereof, and having helical slots adjacent to said pistons;
- a pair of radially directed wedge-shaped reaction elements which project outwardly in diametrically-opposite directions from said primary shaft, being constructed to rotate in said rotor in periodic coalescing relation to said pistons;
- said flywheel supporting a compound planetary gear set comprising a second spur gear and a first elliptic gear;
- a second elliptic gear secured to a portion of said composite housings, said compound planetary gear set being journaled on said flywheel;
- a compound pinion freely rotatable on said drive shaft and constructed to simultaneously mate with said first spur gear on said primary shaft and said second spur gear of said compound planetary gear set, whereby following the ignition of a mixture of gas and air compressed between one set of said pistons and the corresponding set of said reaction elements, the resulting expansive force is transmitted from said primary shaft to said drive shaft and to said flywheel.

* * * * *